Jan. 14, 1969         S. A. ROUSE ETAL         3,421,646
BULK MILK PICKUP AND TRANSPORT CONTAINERIZATION SYSTEM
Filed Oct. 18, 1966                    Sheet 1 of 3

INVENTORS
STEWART A. ROUSE,
THOMAS C. OLSON
BY
Williamson, Palmatier
& Bains
ATTORNEYS

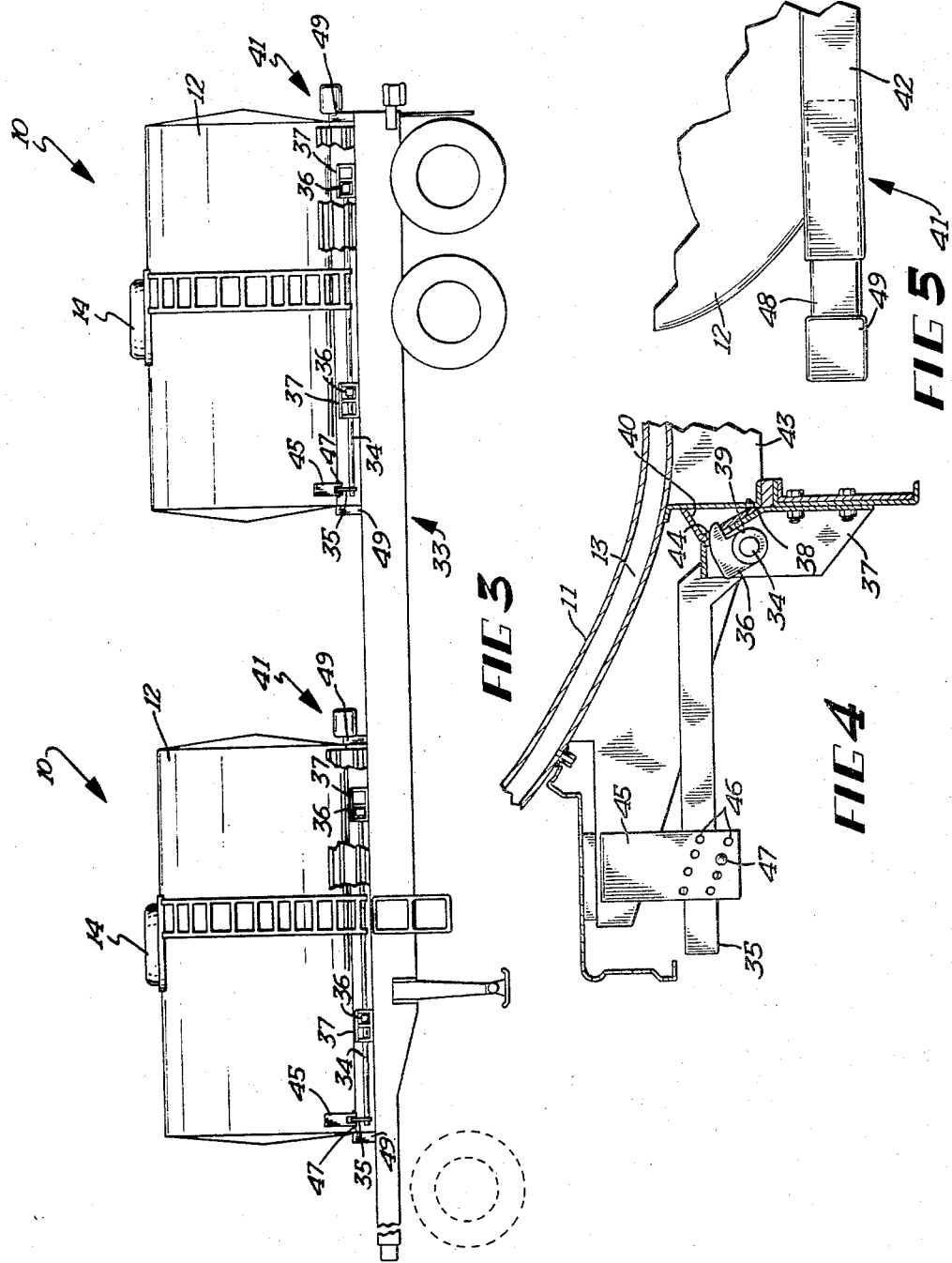

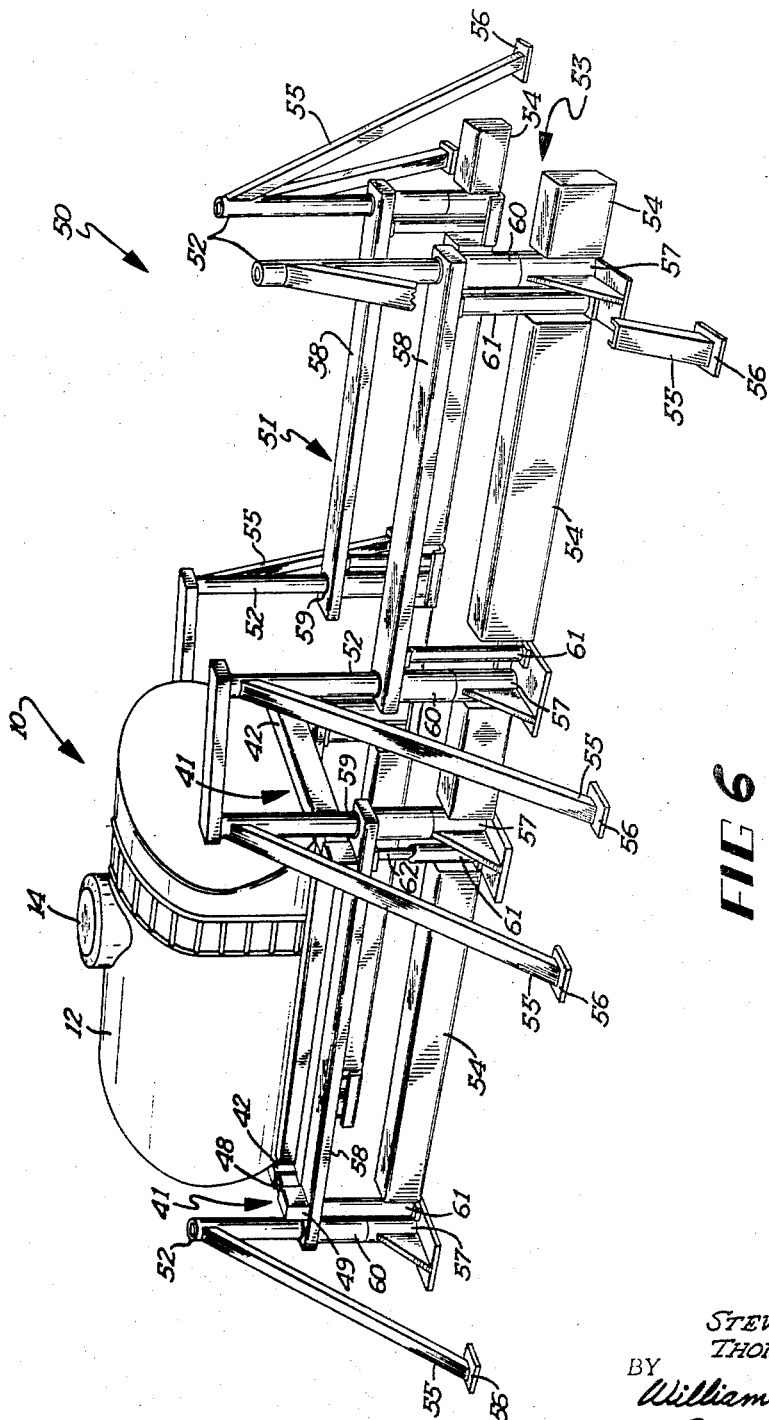

United States Patent Office 3,421,646
Patented Jan. 14, 1969

3,421,646
BULK MILK PICKUP AND TRANSPORT
CONTAINERIZATION SYSTEM
Stewart A. Rouse, P.O. Box #907, Sykes Ave., White River Junction, Vt. 05001, and Thomas C. Olson, Minneapolis, Minn.; said Olson assignor to Stainless & Steel Products Co., St. Paul, Minn., a corporation of Minnesota
Filed Oct. 18, 1966, Ser. No. 587,585
U.S. Cl. 214—515    1 Claim
Int. Cl. B60p 1/64

ABSTRACT OF THE DISCLOSURE

A vehicle for transporting bulk quantities of material such as milk including a chassis having ground engaging wheels, and a bulk tank mounted on the chassis. Cooperating locking means on the tank and chassis for releasably locking the tank on the chassis. Camming elements on the chassis and tank for facilitating positioning of the tank on the chassis, the tank being provided with fore and aft spaced apart pairs of suporting arms, each arm being extensible and retractable and serving to facilitate transfer of the tank to a transfer device.

---

One conventional way milk is collected from pickup points, such as farms, for shipment to a processing center, is through the use of relatively large pickup trucks which are equipped with large bulk tanks. These large pickup trucks collect milk from individual dairy farmers and thereafter transport the milk to a central plant for further processing. Quite often, the pickup points are quite remote from the central processing plant, and the pickup tanks should be of sufficient size to permit the operation to be economical.

However, in certain rural areas, because of narrow winding roads and small farmyard entries, it is not possible to use large vehicles which have large bulk tanks for milk pickup. Thus, smaller pickup tanks are used which are brought to a receiving station where the milk is then transferred from the smaller bulk tanks to large bulk tanks prior to delivery of the milk to the processing station. This transfer from the smaller tanks to the larger tanks is accomplished generally by pumping the milk from the smaller tanks into the larger tanks and this is a time consuming and costly operation.

It is therefore a general object of this invention to provide an apparatus for use in transferring a plurality of smaller bulk tanks, each releasably mounted on a vehicle, to a larger vehicle for transfer to a processing plant.

A more specific object of this invention is to provide apparatus including smaller bulk tanks for carrying milk and the like, each being mounted on a releatively small vehicle and each tank being capable of ready removal from its associated vehicle, to a transfer station so that at least a pair of such tanks may be readily transferred from the transfer station to a relatively large vehicle for transportation to a central processing plant. In the present apparatus, the transfer station includes a plurality of transfer devices each comprising a plurality of fluid pressure operated lifts which are arranged to transfer a pair of the smaller bulk tanks to a larger vehicle upon which the tanks are releasably mounted.

A further object of this invention is to provide a novel and improved hold-down means for releasably interlocking each bulk tank on either the smaller or large vehicle.

Another object of this invention is to provide an apparatus of the class described wherein the chassis of the smaller vehicle has a pump device mounted thereon which is readily connectible in communicating relation to each tank thereby permitting milk to be readily introduced into the tank from each pickup point but permitting the tank to be readily transferred from the vehicle without necessitating the transfer of the pump device.

These and other objects and advantages of this invention will more fully appear from the following description made in connection with the accompanying drawings, wherein like reference characters refer to the same or similar parts throughout the several views, and in which:

FIG. 3 is a side elevational view illustrating a pair of bulk tanks mounted on the chassis of a larger vehicle;

FIG. 4 is a cross-sectional view on an enlarged scale taken approximately along line 4—4 of FIG. 3 and looking in the direction of the arrows;

FIG. 5 is a fragmentary detailed end elevational view illustrating one of the telescopic supporting members of each bulk tank;

FIG. 6 is a perspective view illustrating details of construction of the transfer station.

Figure 1:
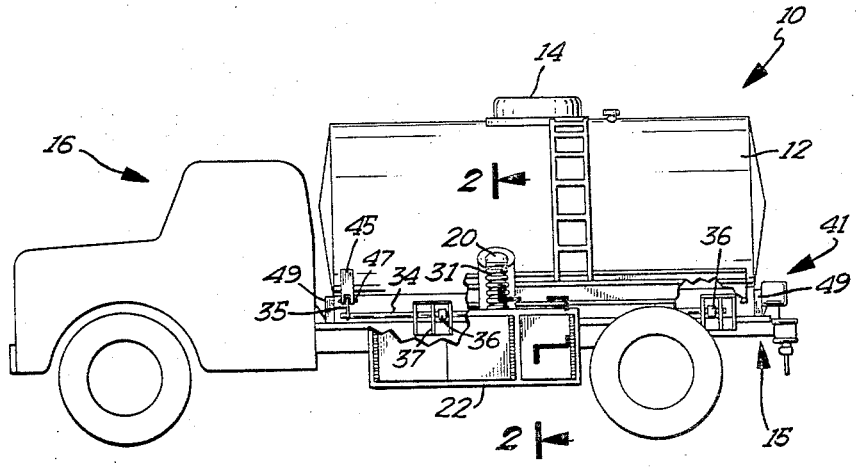
FIG. 1 is a side elevational view illustrating a bulk tank mounted on the chassis or bed of a small pickup vehicle.

Referring now to the drawings, it will be seen that a bulk tank of the type used to contain liquids as illustrated in FIG. 1, in mounted relation upon a smaller pickup vehicle and in FIG. 3 the pair of tanks are illustrated in mounted relation upon a larger transport vehicle. The bulk tank, designated generally by the reference numeral 10, is preferably of the insulated type and is therefore especially adapted for use in transporting milk in a cooled condition to prevent spoilage thereof. Thus, the tank 10 is preferably of generally cylindrical configuration and includes an inner shell 11 and an outer shell 12 spaced outwardly and substantially concentrically of the inner shell 11. The insulating space 13 between the respective shells, serves to minimize heat transfer action to occur between the inner and outer shells and if desired, this space may be filled with a suitable insulating core material. It is pointed out that the respective ends of the tanks are closed by end walls which are also of double shelled construction.

The tank is provided with an access opening in the top thereof which is covered by a closure member 14. It is pointed out that the bulk tank 10 is of relatively small size as compared to the larger bulk tanks which are often used to transfer milk and the like from various pickup points to a central processing station. The tanks 10 have a capacity of approximately 2600 gallons and may therefore be very nicely accommodated on the chassis or frame 15 of a truck or other similar vehicle 16.

Figure 2:
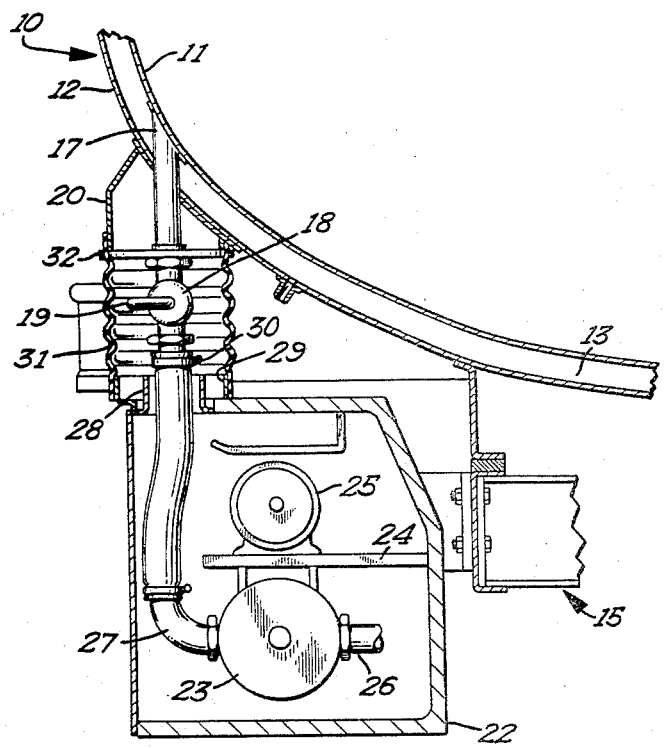
FIG. 2 is a cross-sectional view on an enlarged scale taken approximately along line 2—2 of FIG. 1 and looking in the direction of the arrows.

Referring now to FIGS. 1 and 2, it will be seen that the tank 10 also has one end of a conduit 17 connected thereto in communication relation to the interior thereof, this conduit 17 depending from the tank 10 adjacent one side thereof. A valve mechanism 18 is interposed in flow controlling relation with respect to conduit 17 and this valve mechanism includes an operating handle 19 which is movable to shift the valve element of the valve mechanism 18 between closing and opening relation with respect to the conduit 17.

A relatively short tubular member 20 is affixed to the tank 10 adjacent one side thereof and is disposed around that end of the conduit 20 which is attached to the tank 10. It will be noted that the tubular member 20 depends downwardly a short distance from the tank 10 and its lower end terminates above its valve mechanism 18 at best seen in FIG. 2.

The chassis 15 is provided with a pump device 21 which is permanently mounted thereon, and this pump device includes a housing 22 which is affixed to chassis 15 adjacent one side thereof and positioned below the lower end of the conduit 17. It will be seen that the pump device 21 includes a rotary pump 23 positioned within the housing 22 and suspended from a support plate 24. An electric motor 25 which is operatively connected to the pump 23 serves to operate the latter. One end of an inlet conduit 23 is connected to the pump 23, and the other end of this conduit is adapted to be connected to the discharge conduit or outlet of the milk cooler in which the milk to be picked up is stored. One end of an outlet conduit 27 is connected to the pump 23 while the other end of this outlet conduit is releasably connected in communicating relation to the lower end of the conduit 17. With this arrangement, the motor 25 may be energized to operate the pump 23 whereby milk may be withdrawn by suction action of the pump 23 and discharged into the tank 10. To this end, it is pointed out that the pump 23 is of the evacuation or suction type. With this arrangement, milk may be very easily and quickly evacuated from the cooling tank to the transport tank 10 while permitting the tank 10 to be removed from the chassis 15 without necessitating the removal of the pump device with the tank 10.

It will be noted that while the housing 22 is substantially sealed from the exterior it does have an opening in the upper end thereof and this opening has an outer flange 28 positioned therearound. It will be noted that the flange 28 is of annular construction and is secured to a housing and is positioned exteriorly of an inner flange 29 which is also of annular construction and which circumscribes the opening in the housing. The conduit 27 projects upwardly through the flange 29 and this conduit has its upper end releasably clamped by a clamping element 30 to the lower end of the conduit 17. A generally tubular shaped collaspible cover or guard member 30 is secured to the outer flange 28 and projects upwardly therefrom. This tubular cover or guard member 31 is preferably formed of a yieldable material, such as plastic or the like, and its upper end is adapted to be releasably connected to the tubular member 20 by means of a clamping element 32. It will be seen that with this arrangement, the entire pump device, as well as the conduit 17 and valve mechanism 18, are completely sealed from the exterior when milk is being introduced into the tank 10. Milk may be introduced into the tank 10 by merely shifting the operating handle 19 to open the valve mechanism 18 and thereafter energizing the motor 25 to operate the pump 23. The valve 18 may be closed and a tubular cover member 31 may be disconnected from the tubular member 20 when the tank 10 is transferred from one vehicle to the transfer station.

Referring now to FIGS. 3 and 6, it is pointed out that each tank 10 is transferred from supported relation on the chassis 15 to a transfer station as best seen in FIG. 6, and then to a second larger vehicle which is capable of supporting and transporting a pair of such tank structures 10. It is pointed out that the chassis 10 as well as the larger chassis 33 are both provided with means for releasably retaining the tanks thereon. It is further pointed out that the chassis or frame 33 is a mobile trailer type and is provided with suitable hitch means for connection to a prime mover such as a tractor or the like. In the embodiment shown, the chassis or frame 33 is provided with pairs of rear ground engaging wheels that are arranged in tandem to support the same for travel over the ground and the front end is adapted to be connected by suitable fifth wheel device to the prime mover.

The means for releasably retaining the tanks in supported relation on either the chassis 33 or the chassis 15 is thus illustrated in FIGS. 1, 3 and 4. Particular reference is made now to FIG. 4 wherein it will be seen that chassis 15 is provided with a pair of rock shafts 34 each being positioned along one side of the chassis, and each being mounted for revolving movement about its longitudinal axis. The chassis 33 is also provided with two pairs of such rock shafts 34, each pair being arranged in laterally spaced apart relation along opposite sides of the chassis 33, one pair being positioned forwardly of the other. These rock shafts 34 are journalled in suitable bearings, and each rock shaft has an elongate crank arm 35 affixed thereto for rotation therewith. Each rock shaft has a pair of longitudinally spaced apart latch elements 36 affixed thereto for rotation therewith and these latch elements are movable into and out of latching relation with latching elements on the tank structures.

Referring again to FIGS. 1, 3 and 4, it will be seen that each chassis 15 and 33 has a plurality of lateral positioning camming elements 37 affixed thereto and arranged in pairs along opposite sides thereof. Each of these camming elements has a generally inclined surface 38 which is engageable with an inclined surface 39 on lateral positioning camming elements 40 which are secured to each tank 10. To this end, it will be seen that each tank 10 has a generally rectangular shaped frame affixed to the lower surface thereof and each frame, designated generally by the reference numeral 41, includes front and rear transverse frame elements 42 and longitudinal frame elements 43. It will be noted that the cam elements are affixed to the longitudinal frame elements 43 of each frame 41, two such cam elements being provided for each side of each tank 10. It will also be noted that each cam element 40 has an opening 44 therein which serves to receive a latch portion of each latch element 36 therein when the latter is in the locking position.

It is also pointed out that each chassis also has a plurality of end positioning cam elements thereon which cooperate with similar cam elements on the transverse frame elements 42 of each tank, and serve to position the tanks accurately in a fore and aft direction to facilitate latching thereof with the releasable locking means. With this arrangement, the tanks 10 may be quickly and accurately positioned on the chassis of either the pickup vehicle or the transport vehicle without requiring extensive manipulation of the tank with respect to the chassis.

Means are also provided for holding the latch elements 36 in locked relation with respect to the camming elements on the tank, and to this end it will be seen that the chassis 15 has a pair of locking plates 45 secured thereto adjacent opposite sides thereof. The chassis 33, on the other hand, has two pairs of the locking plates 45 secured thereto, each pair being disposed in laterally spaced apart relation and located at opposite sides of the chassis. Each of the locking plates 45 has a bifurcated lower end portion, the respective arms or bifurcations of which are provided with suitable apertures 46 therethrough, to accommodate a locking pin 47. It will therefore be seen that when the crank arm 35 for each rock shaft 34 is raised, so that the outer end of this crank arm is positioned within the bifurcations of the associated locking plate 45, and the pin 47 is thereafter inserted through registering openings 46 in the bifurcations of the associated locking plate, the crank arm 35 will be held in its elevated position. When in this position, the associated latch elements will be disposed in latching engagement with the cam elements 44. It will be seen that the latch elements 36 may be revolved to the release position by removing the pin 47 of the associated locking plate and allowing the arm 35 to be moved downwardly in a counterclockwise direction, as viewed in FIG. 4. With this arrangement, the tank may be readily locked or released with respect to the associated chassis.

Each tank 10 is also provided with means which permits support of the tank on the lift device at each transfer station. To this end, it will be seen that the transverse frame elements 42 of the frame 41 of each bulk tank 10 is of generally rectangular hollow construction so that each end thereof receives one end of an elongate arm 48 therein. The outer end of each arm 48 has an enlarged support element 49 affixed thereto for movement therewith and it will be seen that the arms 48 are extensible and retractable relative to the associated transverse frame elements 42. When the bulk tank 10 is mounted on either the chassis 15 or the chassis 33, the arms 48 will be retracted or telescoped into the ends of the transverse frame elements, but the arms will be extended when the bulk tank is supported at the transfer station. It will be noted, that when the arms are in the retracted position, the support elements 49 on the arms will engage the ends of the frame elements 42 to limit further inward movement of the arms.

Referring now to FIG. 6, it will be seen that the transfer station, designated generally by the reference numeral 50 is there shown. In the embodiments shown, the transfer station 50 will include a plurality of lift devices 51 and wherein a pair of such lift devices 51 are disposed in end-to-end relation. Each lift device 51 includes a plurality of generally tubular vertical guide posts 52 which are arranged in longitudinally aligned pairs, each pair being positioned on opposite sides of a runway designated generally by the reference numeral 53 and defined laterally by curb blocks 54. It will be noted that the guide posts 52 are provided with suitable diagonal brace members 55 which are rigidly secured to the upper end of the post and which extend diagonally downwardly therefrom and are secured to base pads 56 to be suitably anchored in concrete footings. It will further be noted that the lower ends of each guide post 52 is provided with a sleeve 57 which is positioned concentrically therearound and which is rigidly secured thereto.

Each lift device 51 also includes a pair of substantially parallel longitudinally extending elongate lift members 58 each being apertured at its opposite end as at 59. Each lift member 58 has a pair of guide sleeves 60 rigidly secured thereto, each sleeve being located at one end of the associated lift member and communicating with the aperture 59 in the lift member. It will be noted, that the guide posts 52 project through the sleeves 60 and apertures in the lift member to permit vertical sliding movement of the lift members relative to the guide posts 52. The fixed sleeve 57 on each guide post 52 limits downward movement of each lift member while the braces 55 limit upward movement of each lift member.

Means are provided for causing vertical shifting movement of these lift members and this means includes a pair of hydraulic cylinders for each lift member 58, each of these hydraulic cylinders 61 having a piston therein to which is secured a piston rod 62, which in turn is secured to one of the lift member 58. These hydraulic cylinder and piston units are of the double acting type and will be connected by suitable conduit means (not shown) to a source of hydraulic fluid under pressure. Control valves will be provided which may be actuated by a central control whereby each laterally spaced apart pair of lift members may be simultaneously raised and lowered upon extension and retraction of the piston rods 62.

With this arrangement, the bulk tanks may be lifted from one vehicle by the lift members 58 and may be thereafter lowered and positioned upon another vehicle.

During use of the apparatus, a bulk tank 10 will be mounted upon the chassis 15 of a small truck 16 and will be used to pick up milk at the various farms. When such a tank 10 is mounted on the chassis 15, the latch elements 36 will be in locked relation with respect to the cam elements 40. The crank arms 35 will be in locked upper position and the arms 48 will be in the retracted position. The conduit 27 will be connected to the conduit 17 and the cover or guard member 31 will be in enclosing relation with respect to the valve mechanism 18 and the conduit portion connected thereto. The truck with the bulk tank 10 mounted thereon will make the several stops and will receive milk from the various points along the pickup route until the tank 10 is filled.

Thereafter, the vehicle 16 will be driven to the transfer station 50 and will be driven along the runway 53 between the curb blocks 54 until the tank is in position to be transferred to one of the lift devices 51. It is pointed out that the lift device 51 will be in the lowered position and the crank arms 35 will be unlocked from their locked relation thereby permitting the same to be swung downwardly to unlatch the latch elements 36 with respect to the cam elements 40. The valve mechanism 18 will, of course, be in the closed condition and the conduit 27 will be disconnected from the conduit 17. Thereafter, the arms 48 will be extended from the retracted position to overlie the lift member 58. The control valve mechanism for the hydraulic piston and cylinder unit will be actuated to cause the lift members of one lift device to be elevated, which lifts the tank 10 from the chassis 15. The vehicle will thereafter be driven away and another pickup truck will be unloaded on the adjacent longitudinally aligned lift device.

Thereafter, the larger chassis 33 may be moved into the runway 53 and the chassis 33 will be positioned in proper relation below the bulk tanks 10 which will be supported on the lift devices while the latter are in the elevated or raised position. Thereafter, when the lift devices are lowered the cooperation of the various positioning cam elements on the tanks and on the chassis will facilitate proper positioning of the tanks on the chassis. The crank arms will then be swung upwardly to lock the bulk tanks on the chassis 33 and the crank arms will be secured in their upper position. The conduit 27 will be connected in communicating relation to the conduit 17 and the guard member will be connected to the tubular member 20. The arms 48 will be shifted to the retracted position and the larger chassis will be removed from the runway by the prime mover and the bulk tanks will be delivered to the central processing plant.

After the tanks have been emptied, the tanks may be cleaned and returned by the larger chassis to the transfer station where the tanks may then be transferred to the lift devices. Thereafter, the bulk tanks may be picked up by the pickup trucks whereby the tanks will be mounted on the chassis 15 of each truck.

With this arrangement, it will be seen that smaller pickup trucks may be used to negotiate the smaller roads and driveways which characterize certain rural areas. However, by utilizing a transfer station of the type described, a plurality of the smaller bulk tanks may be readily transferred to a larger carrier for transportation of the tanks to the processing plant. Thus, it will be seen that the present apparatus system permits milk to be collected in rural areas remote from a processing plant in which they do not have roadway systems and the like that will accommodate the larger bulk tanks, in such a manner that the operation may be very efficiently and economically accomplished.

It will further be noted that the apparatus is of relatively simple construction and operation and is capable of more efficient use and operation than any heretofore known comparable apparatus system.

It will, of course, be understood that various changes may be made in the form, details, arrangement and proportions of the various parts without departing from the scope of my invention.

What is claimed is:

1. Mobile tank apparatus for transporting bulk quantities of a material such as milk, said apparatus comprising a vehicle including a chassis having ground engaging wheels, a bulk tank mounted on said chassis, cooperating releasable locking means for releasably locking the tank on said chassis, said locking means including a pair of elongate rock shafts positioned on opposite sides of said chassis and extending longitudinally thereof and being revolvable about their respective longitudinal axes, lock engaging elements on said tank, locking elements on each of said rock shafts and movable therewith into and out of interengaging locked relation with said lock engaging elements, and means for retaining said rock shafts in locked relation, cooperating mating camming elements said chassis and tank respectively for positioning said tank on said chassis to facilitate locking of the tank on chassis, a pump device on said chassis, means releasably interconnecting said tank and said pump device in communicating relation when said tank is mounted on said chassis, said tank being provided with fore and aft spaced pairs of supporting arms, the arms of each pair being extensible and retractable laterally and transversely of said tank to facilitate transfer of said tank to a transfer device.

References Cited

UNITED STATES PATENTS

| | | | |
|---|---|---|---|
| 1,303,854 | 5/1919 | Clark | 214—515 |
| 1,433,713 | 10/1922 | Fricker | 137—354 XR |
| 1,471,111 | 10/1923 | Eder. | |
| 2,351,314 | 6/1944 | Ario | 296—35 |
| 2,517,304 | 8/1950 | Greening | 214—515 |
| 3,109,445 | 11/1963 | Holmes | 137—354 |
| 3,119,503 | 1/1964 | Herpich et al. | 214—515 |

ALBERT J. MAKAY, *Primary Examiner.*

U.S. Cl. X.R.

214—38; 296—35; 137—354